US012490956B2

(12) United States Patent
Charron et al.

(10) Patent No.: US 12,490,956 B2
(45) Date of Patent: Dec. 9, 2025

(54) ROBOT-ASSISTED TELE-ECHOGRAPHY PROBE

(71) Applicant: ADVANCED ECHO TECHNOLOGY, Naveil (FR)

(72) Inventors: Gwenaël Charron, Vendôme (FR); Eric Lefebvre, Huisseau en Beauce (FR)

(73) Assignee: ADVANCED ECHO TECHNOLOGY (FR)

( * ) Notice: Subject to any disclaimer, the term of this patent is extended or adjusted under 35 U.S.C. 154(b) by 247 days.

(21) Appl. No.: 18/257,218

(22) PCT Filed: Dec. 17, 2021

(86) PCT No.: PCT/FR2021/052387
§ 371 (c)(1),
(2) Date: Jun. 13, 2023

(87) PCT Pub. No.: WO2022/129812
PCT Pub. Date: Jun. 23, 2022

(65) Prior Publication Data
US 2024/0050066 A1     Feb. 15, 2024

(30) Foreign Application Priority Data
Dec. 17, 2020   (FR) ...................................... 2013519

(51) Int. Cl.
*A61B 8/00*     (2006.01)
(52) U.S. Cl.
CPC .......... *A61B 8/4444* (2013.01); *A61B 8/4218* (2013.01)

(58) Field of Classification Search
CPC ........................... A61B 8/4444; A61B 8/4218
See application file for complete search history.

(56) References Cited

U.S. PATENT DOCUMENTS

2015/0209016 A1*  7/2015  Lefebvre ............. G01S 15/8936
                                                        600/472
2017/0311923 A1   11/2017  Saberi et al.

FOREIGN PATENT DOCUMENTS

EP        2887878 B1     11/2016
WO   WO 2014016663 A1     1/2014

OTHER PUBLICATIONS

International Search Report mailed Apr. 8, 2022 in corresponding PCT International Application No. PCT/FR2021/052387.
(Continued)

*Primary Examiner* — Chao Sheng
(74) *Attorney, Agent, or Firm* — OSTROLENK FABER LLP (57) ABSTRACT

A robot-assisted echographic probe that includes an enclosure, an ultrasonic transducer module having a support housing mounted at a distal end of a guide sleeve in a sealed compartment of the enclosure that is separated from a control compartment of the enclosure by a sealed transversal wall, and means for moving the transducer module which are suitable for directing the transducer module along three axes of rotation so as to sweep the inner surface of an enclosure shell of the sealed compartment, the moving means being motor-driven by actuators, at least a portion of the actuators being housed in the control compartment, and the means for moving the transducer module being arranged in the sealed compartment of the enclosure.

16 Claims, 7 Drawing Sheets

(56) References Cited

OTHER PUBLICATIONS

Written Opinion mailed Apr. 8, 2022 in corresponding PCT International Application No. PCT/FR2021/052387.
Gumprecht Jan D J, et al. "Flat-Panel Ultrasound Robot: A Novel Imaging Concept and a Novel Motorized Kinematics for an Ultrasound Probe during Laparoscopie Interventions" 2013 IEEE/RSJ International Conference of Intelligent Robots and Systems (ROS), IEEE. Nov. 3, 2013, pp. 3564-3569.

* cited by examiner

ROBOT-ASSISTED TELE-ECHOGRAPHY PROBE

CROSS-REFERENCE TO RELATED APPLICATIONS

The present application is a 35 U.S.C. §§ 371 national stage application of International Application No. PCT/FR2021/052387, filed Dec. 17, 2021, which claims priority to French Patent Application No. 2013519, filed Dec. 17, 2020, the contents of which are incorporated herein by reference.

FIELD OF INVENTION

The invention relates to the field of tele-echography, for performing an echographic examination and establishing an echographic diagnosis, remotely and in real time. The invention relates more specifically to a robot-assisted echographic probe, comprising an enclosure, an ultrasonic transducer module including a support housing mounted at a distal end of a guide sleeve in a sealed compartment of the enclosure that is separated from a control compartment of said enclosure by a sealed transversal wall, and means for moving said transducer module, adapted to direct said transducer module along three axes of rotation so as to sweep the inner surface of an enclosure shell of the sealed compartment, said moving means being motor-driven by actuators, at least a portion of said actuators being housed in said control compartment.

BACKGROUND

At the present time, tele-echography enables, from a first site, a qualified doctor to operate a robot-assisted echographic probe applied on a patient located in another remote site, the interpretation of the examination being performed in real time by the doctor. Besides the therapeutic benefit, tele-echography provides an adapted response to the problem of regional planning by guaranteeing the same level of care in a context of rationalising health infrastructures, particularly in rural settings.

In concrete terms, using a virtual probe, the doctor controls the robot-assisted echographic probe, which, in real time, reproduces the movements imparted by the doctor on the virtual probe and sends them the medical images captured as the examination progresses, that the doctor can consult on a control monitor.

The robot-assisted probe is therefore handled remotely by the doctor and, to obtain the desired sections, the rotation and inclination movements of the probe must often be very fine. In addition, the robot-assisted probe must be able to reproduce these movements with the greatest precision.

From the patent document EP2887878B1, held by the applicant, a robot-assisted probe device of the aforementioned type is known, comprising an ultrasonic transducer module with multiple elements, mounted in a sealed compartment of an enclosure that is separated from a control compartment of said enclosure by a transversal wall. The enclosure is intended to be applied against the patient's body by disposing the sealed compartment housing the transducer module facing the patient's body. The enclosure shell on the side of the sealed compartment is such that the acoustic coupling between the patient and the front face of the transducer module is optimal and that acoustic characteristics of the transmitted ultrasonic beams are preserved. To promote this acoustic coupling further, the transducer module is submerged in an acoustic coupling agent, for example oil, filling the sealed compartment, so as to promote the propagation of the ultrasonic waves emitted and received by the transducer module.

The transducer module is movably mounted in the enclosure so as to be able to sweep the entire surface of the enclosure shell of the sealed compartment, the latter remaining fixed at the contact zone thereof with the patient's skin. This arrangement is particularly advantageous to make it possible to perform the tele-echography examination with no parasitic movement at the contact zone with the patient's body, only the transducer module in the probe being in motion.

The robot-assisted probe device of this document is adapted to receive instructions for controlling the movement of the transducer module, which are from a control module, designed to compute these control instructions according to the remote movement of the virtual probe operated by the doctor. These control instructions are converted into movement of the transducer module inside the sealed compartment of the enclosure by actuating motor-driven means for moving the transducer module, housed in the enclosure.

These moving means are designed to act upon a support rod at the end whereof the transducer module is mounted. The transducer module and the moving means thereof are housed respectively in the sealed compartment and in the control compartment of the enclosure, the support rod of the transducer module being mounted free in rotation in a tube mounted at the centre of the sealed wall separating these two compartments between them, the rod extending on either side of this wall, the sealed compartment side end thereof supporting the transducer module and the control compartment side end thereof being spun by an actuator.

The motor-driven moving means furthermore include two arches disposed perpendicularly and pivotably mounted in the control compartment overhanging from the sealed wall, the tube receiving the support rod being disposed so as to be moved by the pivoting of each of the two arches, such that the transducer module is adapted to move in the sealed compartment in a pendular fashion with respect to the centre of the sealed wall. Thus, the set of the means for moving the transducer module and the actuators associated respectively with each of the elements of these moving means, are located in the control compartment of the probe enclosure.

Such an arrangement of the moving means and their actuators gives rise to a relative large size in height. However, it is desirable to reduce the size of the probe as much as possible to facilitate the handling thereof and thus be able to carry out tele-echography examinations in particular under conditions of restricted access to the area to be examined.

SUMMARY OF THE INVENTION

An aim of the invention is therefore that of providing a robot-assisted echography probe, which resolves the aforementioned drawbacks and, in particular, which has enhanced compactness.

For this purpose, the robot-assisted probe of the invention, moreover according to the generic definition provided by the preamble above, is essentially characterised in that the means for moving the transducer module are arranged in the sealed compartment of the enclosure.

Advantageously, said means for moving the transducer module comprise a first mechanism for spinning the transducer module on itself about the axis thereof.

Advantageously, said first spinning mechanism is actuated by an actuator housed in a hollow volume of the support housing of the transducer module.

According to an advantageous embodiment, said first spinning mechanism comprises a worm screw, rigidly connected in rotation to the output shaft of the actuator, engaged with a worm wheel mounted in said hollow volume, rigidly connected to a connection shaft, for connection, via a pinion mounted on an upper end of said shaft, with a cogwheel fixedly mounted on an inner periphery of the distal end of the guide sleeve.

Advantageously, said means for moving the transducer module comprise a second mechanism for moving the transducer module in nutation, adapted to pivot said guide sleeve about an axis of nutation perpendicular to the spinning axis of said transducer module.

According to an advantageous embodiment, said guide sleeve being pivotably mounted between a pair of flanges rigidly connected to a turret arranged in the sealed compartment, each flange receiving a pivot whereon said guide sleeve is mounted, said second mechanism for moving in nutation comprises a nutation disk including a circular ramp mounted coaxially in rotation about said turret along a fixed axis of rotation, perpendicular to the axis of nutation, said ramp being linked with a rigidly connected guide roller, via a lever arm, of one of said pivots, such that the rotation of the nutation disk forces the pivoting of said pivot about the axis of nutation according to the angle of inclination of said circular ramp.

Advantageously, said guide roller is held against said circular ramp by an elastic return means opposing the force applied on said pivot by said lever arm.

Preferably, said nutation disk is actuated by an actuator housed in the control compartment.

Advantageously, the output shaft of the actuator is coupled, on the sealed compartment side, with a pinion meshing with a synchronous belt engaged on a ring gear arranged on an outer periphery portion of said nutation disk.

Advantageously, said means for moving the transducer module comprise a third mechanism for moving the transducer module in precession, adapted to control the rotation of said transducer module about a fixed axis of rotation, perpendicular to the axis of nutation.

Advantageously, said third mechanism for moving the transducer module in precession comprises said turret, in turn rotatably mounted in relation to said fixed axis of rotation.

Preferably, said turret is actuated by an actuator housed in said control compartment.

Advantageously, the output shaft of said actuator is coupled, on the sealed compartment side, with a pinion meshing with a synchronous belt engaged on a ring gear arranged on an outer periphery portion of said turret.

Advantageously, said transducer module comprises a set of pads arranged projecting on an active face of said support housing, oriented facing said inner surface of the enclosure shell, each of said pads being intended to come into point contact with said inner surface of the enclosure shell, so as to form a support structure for said enclosure shell.

Advantageously, said pads are made of a material having a low friction coefficient with respect to said inner surface of the enclosure shell, particularly of polytetrafluoroethylene (Teflon®) or similar.

BRIEF DESCRIPTION OF THE DRAWINGS

Further features and advantages of the invention will become more apparent from the description hereinafter, given by way of indication and not limitation, with reference to the appended drawings wherein.

DETAILED DESCRIPTION

The description hereinafter is provided with reference to a tele-echography system, controlled remotely by a qualified doctor.

Figure 1:
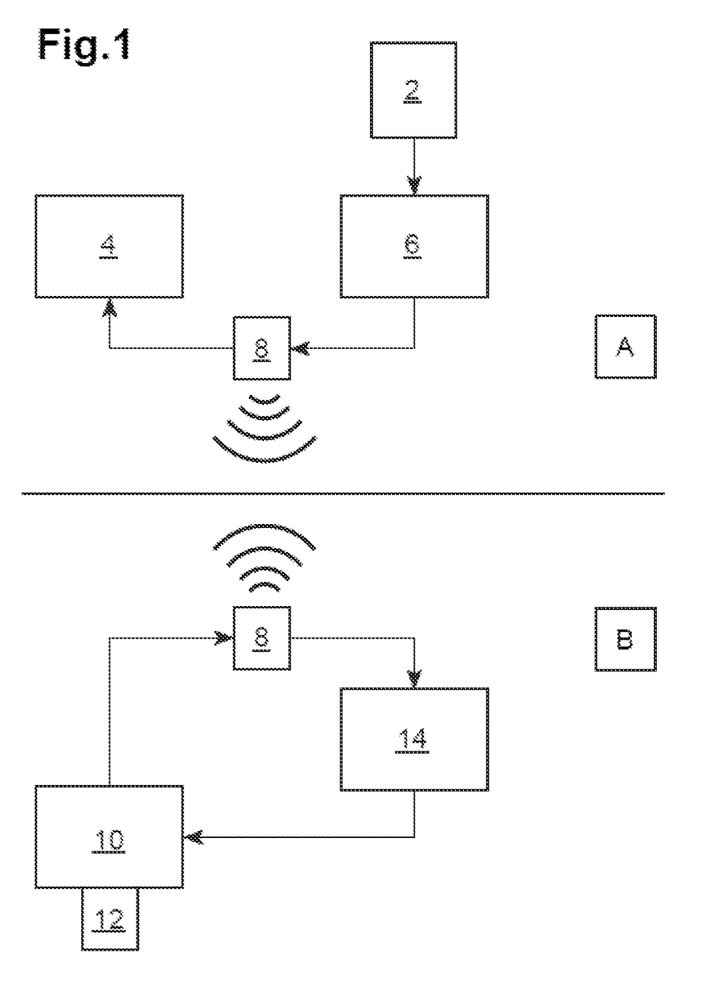
FIG. 1 is a schematic view of a tele-echography system wherein the robot-assisted echographic probe can be implemented.

A tele-echography system is shown in FIG. 1. It includes, on one hand, hardware on a site A where a qualified doctor can manage the echography remotely, and, on the other, embedded hardware in a site B where the patient to be examined is located.

The expert site A includes a virtual probe 2 that the qualified doctor can operate according to the patient's echographic images which are displayed on the control monitor 4. The movements of the virtual probe 2 are measured by sensors integrated in this probe and the relevant movement data are sent to a processing unit 6, which is adapt to encode these data so as to be able to communicate them from the expert site A to the patient site B, via transmitter-receiver modules 8 equipping each site.

The patient site B includes a remote-controlled echography device 10 adapted to perform echography on the patient via a robot-assisted probe 12, controlled according to the movement of the virtual probe on the expert site A.

Figure 2:
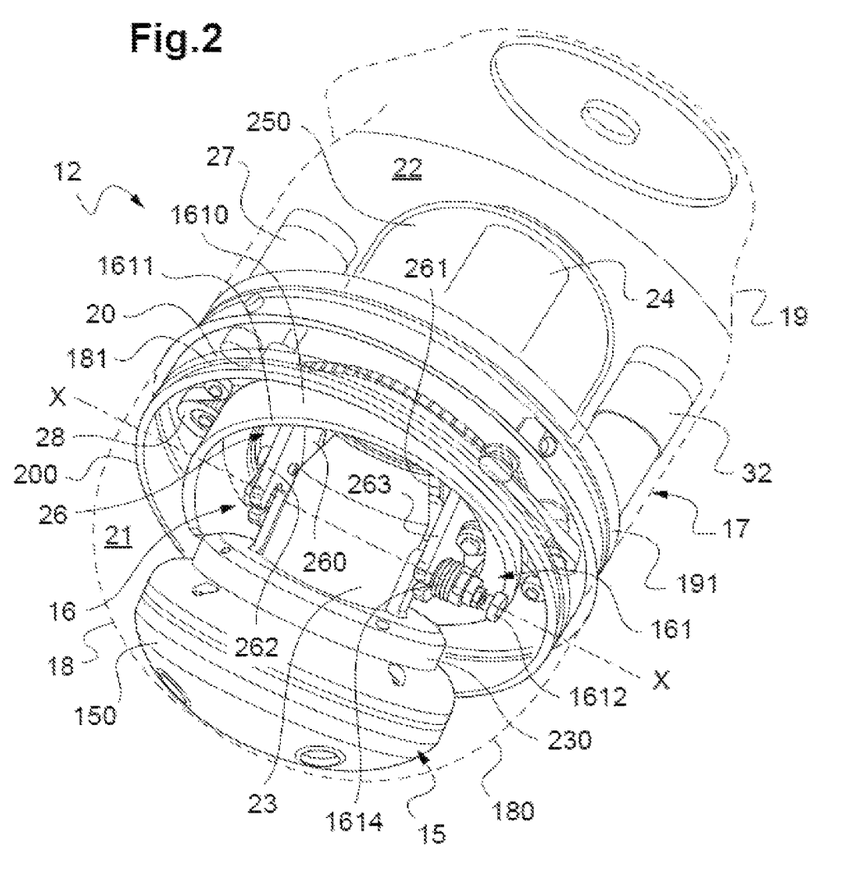
FIG. 2 is a schematic perspective view of a robot-assisted echographic probe according to the invention.

With reference to FIG. 2, the robot-assisted probe according to the invention 12 includes an ultrasonic module with multiple elements 15 for the acquisition of echographic images and means 16 for moving this transducer module 15, partially shown in FIG. 1 and which will be described in more detail hereinafter, the whole being housed in an enclosure 17. The enclosure 17 includes a substantially hemispheric dome 18 and a cover of substantially cylindrical shape 19, shown as a dotted line for greater readability, extended on either side of a sealed wall 20, which extends transversally to the enclosure 17, substantially at the junction of the dome 18 and the cover 19 forming the enclosure, so as to define inside the enclosure 17, on either side of the sealed wall 20, a sealed compartment 21 and a control compartment 22. The sealed wall 20 includes a skirt 200 extending downwards from the wall 20. The dome 18 and the cover 19 are mounted on their peripheral skirt 200 of the sealed wall 20 via a sealing O-ring, respectively 181 and 191, ensuring the tightness between the sealed compartment 21 and the control compartment 22.

The sealed compartment 21 corresponds to the internal volume defined by the sealed wall 20, on one hand, and by the enclosure shell 180 of the hemispheric dome 18, on the other. The enclosure shell 180 of the sealed compartment 21 wherein the transducer module 15 is housed is intended to be applied against the patient's body, preferably via an echographic gel promoting ultrasonic transmission. The enclosure shell 180 of the sealed compartment is made of a material permeable to ultrasonic waves. The transducer module 15 is submerged in an acoustic coupling agent, for example oil, filling the sealed compartment 21, so as to promote the propagation of the ultrasonic waves. The sealed wall 20 ensures that the coupling agent remains confined inside the sealed compartment 21, without discharging inside the control compartment 22.

The transducer module 15 is adapted to be moved inside the sealed compartment 21 by the action of the moving means 16, partially illustrated in FIG. 2, which are controlled according to the movement of the virtual probe on the expert site A. For this purpose, a control module 14, provided on the patient site B, is adapted to receive, via the transmitter-receiver modules 8, the movement data of the virtual probe on the expert site A and to compute, using these movement data, instructions for controlling the movement of the transducer module 15 of the robot-assisted probe. These instructions for controlling the movement of the transducer module 15 are intended to be executed by the moving means 16, in order to enable the acquisition of echographic images similar to those which the qualified doctor would have obtained if they had operated the robot-assisted probe directly.

The principle is therefore that of generating, via the moving means 16, a movement of the transducer module 15 inside the sealed compartment 21, the enclosure shell 180 of the dome 18 defining the sealed compartment 21 remaining fixed. The robot-assisted probe 12 thus makes it possible to carry out the tele-echography operation without there being any parasitic movements on the patient's body, i.e. without moving the enclosure shell to the point of contact thereof with the patient's body, only the transducer module 15 housed in the sealed compartment being moved, according to the same principle as the probe according to the prior art discussed in the preamble.

The echographic images acquired by means of the robot-assisted probe are sent to the expert site A to be displayed on the control monitor 4, so that the qualified doctor can view these images and adapt the movement on the virtual probe to collect other images, where applicable.

As will now be seen in more detail, the means 16 for moving the transducer module, integrated in the robot-assisted probe of the invention, are designed to control the direction of the transducer module 15 in all directions with respect to the enclosure considered as fixed, in the smallest possible size.

The transducer module 15 is associated with a frame, referred to as transducer frame. This frame is movable with respect to the fixed frame of the enclosure. The transducer module 15 can be oriented, with respect to the reference of the enclosure, according to the Euler angles, conventionally used in solid mechanics to describe the direction of a moving solid with respect to a reference frame considered as fixed. Also, the direction of the transducer module 15 with respect to the fixed frame of the enclosure can be controlled according to a first rotation, referred to as precession rotation, a second rotation, referred to as nutation rotation and a third rotation, referred to as spinning, which are the three rotations used to move from the movable frame of the transducer module to the fixed frame of the enclosure.

The moving means 16 integrated in the probe are therefore designed to control the movement of the transducer module 15 according to these three rotational movements, so as to make it possible to sweep the inner surface of the enclosure shell defining the sealed compartment 21.

Firstly, according to an important feature of the invention, the moving means 16, which act upon the transducer module 15 for the movement thereof inside the sealed compartment 21, are arranged in the same functional portion of the probe 12 as the transducer module 15, namely in the sealed compartment 21. In other words, the moving means 16 are entirely housed in the sealed compartment 21 where the transducer module 15 moves, advantageously using the existing size of the internal volume of this sealed compartment 21 to install the moving means 16 therein. The whole, moving means 16 and transducer module 15, being submerged in the acoustic coupling agent filling the sealed compartment 21. Such an arrangement helps obtain a particularly compact probe.

Figure 3:
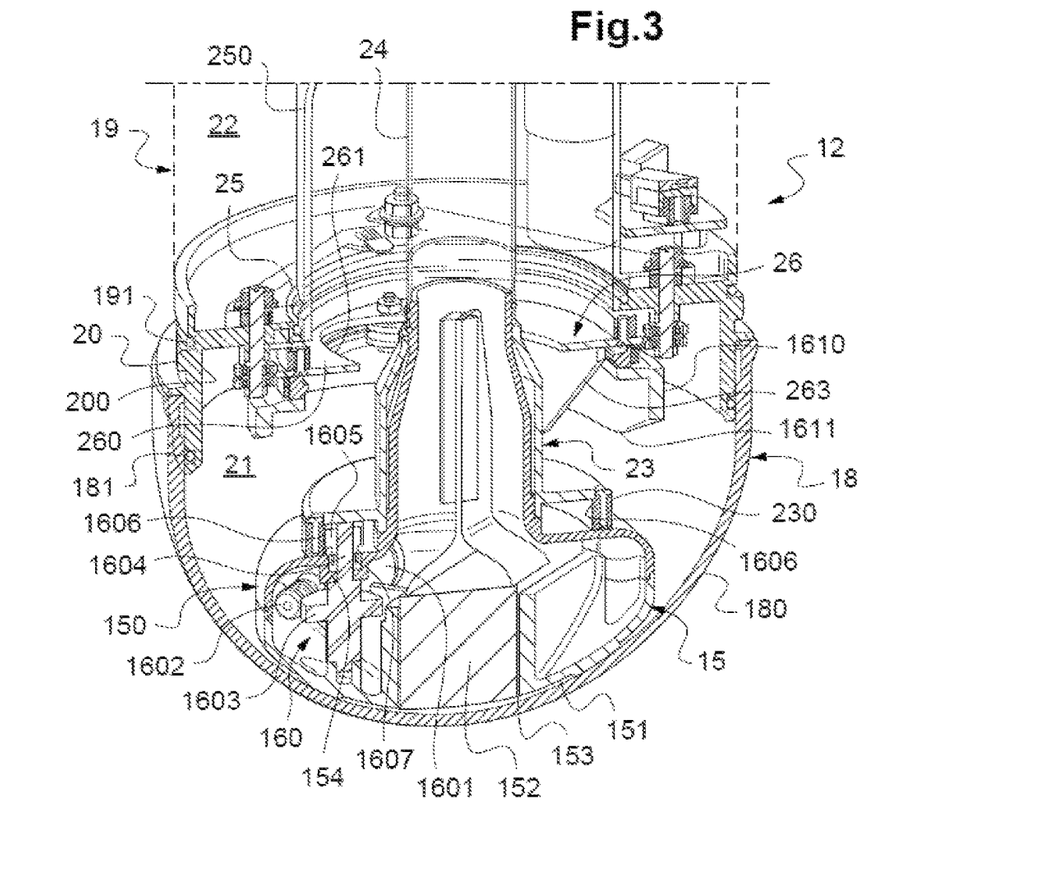
FIG. 3 is a detailed schematic, sectional perspective view of a first mechanism for spinning the transducer module of the robot-assisted probe according to the invention.

As seen more clearly in the sectional view in FIG. 3, the transducer module 15 includes a support housing 150, for example of substantially hemispheric overall shape, preferably consisting of two portions tightly assembled together, and having an active face 151 directed facing the inner surface of the enclosure shell 180 of the sealed compartment 21. This active face 151 has a given radius of curvature, slightly less than the radius of curvature of the enclosure shell 180. A curved ultrasonic transducer 152 is mounted in the support housing 150 so as to have an ultrasound transmission/reception direction through an opening 153 of the active face 151. The curved ultrasonic transducer 152 is formed of a plurality of elementary transducers, for example piezoelectric transducers, each elementary transducer being capable of emitting and/or detecting an ultrasonic wave. The elementary transducers can be arranged so as to form a linear detection network on the active face 151 of the support housing 150, or along two dimensions, so as to form a detection array on this active face 151. The elementary transducers can be activated simultaneously or in turns according to the control instructions from an echography apparatus (not shown), which can optionally integrate the control module 14 of the moving means 16.

The transducer module 15 is mounted on the distal end 230 of a guide sleeve 23. The guide sleeve 23 comprises an upper end, opposite the distal end 230 thereof, tightly mounted, via one or more sealing O-rings, in a flexible sheath 24, passing through a central opening 25 formed in the sealed transversal wall 20, and connected to a cable sleeve (not shown) fastened at the upper portion of the cover 19 to bring into the probe the connections of the transducer module 15.

A secondary cover 250, located inside the cover 19 defining the control compartment 22, tightly covers the central opening 25 of the sealed transversal wall 20. Also, this secondary cover 250 is mounted on the central opening 25 via a sealing O-ring ensuring the tightness between the inside of the secondary cover 250, on the side of the sealed compartment 21 and outside the secondary cover 250, on the side of the control compartment 22 of the probe 12. The flexible sheath 24 tightly passes through an opening formed in the secondary cover 250, opposite the central opening 25 of the sealed wall 20, to be connected to the cable sleeve.

The guide sleeve 23 is hollow so as to enable the passage of the connections of the transducer module 15, conveyed into the probe 12 via the cable sleeve fastened to the top portion of the cover 19 and the flexible sleeve 24, passing through the secondary cover 250 and connected to the upper end of the guide sleeve 23.

As described above, the transducer module 15 is capable of performing a spinning movement about the axis thereof, i.e. about the axis of the support housing 150, in turn merged with the axis of the guide sleeve 23. Thus, the transducer module 15 is rotatably mounted about the axis thereof with respect to the distal end 230 of the guide sleeve 23 whereon it is mounted.

The means for moving the transducer module 15 are then adapted to control this spinning movement of the transducer module 15. In other words, the moving means are adapted to rotate the transducer module 15 on itself in both the clockwise and anticlockwise direction, in particular according to control instructions provided by the control module.

For this purpose, the means for moving the transducer module 15 comprise a first mechanism 160 for spinning the transducer module 15 on itself about the axis thereof.

This first spinning mechanism 160 is actuated by an actuator 1601, advantageously housed in a hollow volume of the support housing 150 of the transducer module 15, adjacent to the integration zone of the curved ultrasonic transducer 152 in this support housing 150. This electric motor type actuator 1601, controls a worm screw type transmission element 1602, engaged with a worm wheel 1603 also mounted in the hollow volume of the support housing 150, rigidly connected to a connection shaft 1604, for connection, via a pinion 1605 mounted on the upper end of this shaft, with a cogwheel 1606 rigidly connected to the distal end 230 of the guide sleeve 23. This arrangement of the first spinning mechanisms 160 thus moves towards the sought compactness, using the existing hollow volume of the transducer module.

More specifically, the axis of the output shaft of the actuator 1601 is located in the axis of the worm screw 1602, which meshes with the tangent worm wheel 1603 rigidly connected to the connection shaft 1604, which is perpendicular to the axis of the worm screw 1602. The connection shaft 1604 passes tightly, via a rotary seal 1607 mounted about the shaft, through an upper wall 154 of the support housing 150, mounted adjacent to the distal end 230 of the guide sleeve 23, and meshes, via the pinion 1605 mounted at the upper end thereof, which opens into the distal end 230 of the guide sleeve 23, on the cogwheel 1606, fixedly mounted on an inner periphery of the distal end 230 of the guide sleeve 23.

In this way, during the operation of the actuator 1601, housed in the transducer module 15, which moves the worm screw 1602 and the worm wheel 1603 engaged between them, the connection shaft 1604 meshes on the cogwheel 1606 via the pinion 1605, spinning (on itself) the transducer module 15 with respect to the fixed cogwheel 1606. It is thus easy to perform a setting of the position of the transducer module 15 about the spinning axis thereof, corresponding to the axis of the support housing 150, by controlling the activation of the first moving mechanism 160.

The worm screw 1602 and worm wheel 1603 and pinion 1605 transmission system of the first moving mechanism 160 makes it possible to obtain large reduction ratios. In other words, the transmission system provides sufficient gear reduction of the movement here to enable the integration of a small low-power electric motor to act as the actuator 1601 of the first moving mechanism 160, which is favourable for compactness.

Moreover, the first spinning mechanism 160 comprises one or more angular position sensors, not shown, for example a Hall effect sensor type sensor, which makes it possible to position the transducer module 15 in a known position (referred to as initial position), the position from which all the position set-points of the moving means are computed.

As explained above, the transducer module 15 can also be directed with respect to the fixed frame of the enclosure according to another rotation, referred to as nutation rotation.

As seen more clearly in the perspective view in FIG. 2, the guide sleeve 23, supporting at the distal end 230 thereof the transducer module 15, is pivotably mounted about an axis of rotation X-X, referred to as axis of nutation, on a turret 26 arranged in the sealed compartment 21, this axis of nutation X-X being perpendicular to the spinning axis of the transducer module 15. In other words, the spinning axis of the transducer module 15 is capable of following a rocking lever movement about this axis of nutation X-X.

The turret 26 includes a transversal base 260, mounted inside the skirt 200, under the central opening 25 of the sealed wall 20. The base 260 comprises an oblong opening 261, disposed facing the central opening 25, for the passage of the flexible sheath 24 extending from the upper end of the guide sleeve 23. The dimension of the oblong opening 261 along the major axis thereof corresponds to the extent of the pivoting travel in either direction of the guide sleeve 23 about the axis of nutation X-X.

The transversal base 260 comprises two flanges 262, 263, between which the guide sleeve 23 can be pivotably mounted about the axis of nutation X-X. The two flanges 262, 263 extend perpendicularly to the base 260, and are disposed opposite one another with respect to the oblong opening 261 along the minor axis thereof. The two flanges extend in planes parallel with the opposite of the central opening 25 of the sealed wall 20.

Figure 4:
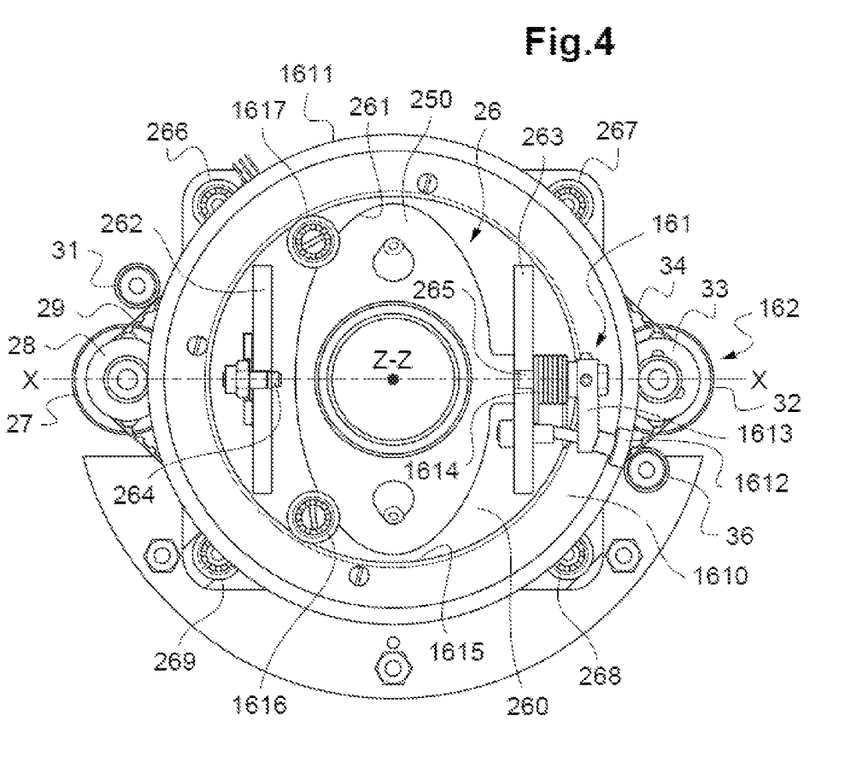
FIG. 4 is a simplified schematic bottom view of a second mechanism for moving the transducer module in nutation of the robot-assisted probe according to the invention.

The pair of flanges 262, 263 supports the axis of nutation whereon the guide sleeve 23 is pivotably mounted. As seen more clearly in the simplified bottom view in FIG. 4, representing a detailed view of the arrangement of the turret 26, viewed from the side of the sealed compartment, without the flexible sheath, the guide sheath and the transducer module for greater readability, each flange 262, 263 is perforated with an orifice wherein a pivot 264, 265 extending along the axis of nutation X-X, whereon the guide sleeve 23 is mounted, is received.

The means for moving the transducer module 15 integrated in the probe are then adapted to control the nutation movement of the transducer module 15. In other words, the moving means are adapted to pivot the guide sleeve 23 with respect to the turret 26 whereon it is mounted, in particular according to control instructions provided by the control module.

For this purpose, the means for moving the transducer module 15 comprise a second mechanism 161 for moving the transducer module 15 in nutation.

This second mechanism 161 for moving the transducer module 15 in nutation comprises a nutation disk 1610, mounted inside the skirt 200, coaxially with the turret 26, capable of rotating about a fixed axis of rotation Z-Z, perpendicular to the axis of nutation X-X. This disk 1610 includes a circular ramp 1611, extending about the periphery of the turret 26, which has a certain inclination with respect to the axis of nutation X-X. The circular ramp 1611 is linked with a guide roller 1612, rigidly connected, via a lever arm 1613, with one of the pivots 265 mounted on the flanges of the turret 26 along the axis of nutation X-X. The guide roller 1612 is advantageously kept continuously pressed against the circular ramp 1611 of the nutation disk 1610 by an elastic return means opposing the force applied on the pivot 265 by the lever arm 1613. These return means comprise a return spring 1614 mounted on the axis of rotation of the pivot 265.

Thus, the circular ramp 1611 is coupled via the guide roller 1612 and the lever arm 1613 with the pivot 265. Also, when the nutation disk 1610 is rotated about the axis of rotation Z-Z thereof, the turret 26 remaining fixed, the guide roller 1612 rolls over the surface of the circular ramp 1611 while remaining pressed thereon via the return spring 1614, which forces the pivoting of the pivot 265 about the axis of nutation X-X according to the angle of inclination of the ramp 1611 and hence, drive the pivoting of the guide sleeve 23 supporting the transducer module 15 about the axis of nutation X-X.

The second mechanism 161 for moving in nutation thus makes it possible to control the angle of inclination that the transducer module 15 can adopt in the sagittal plane of the turret 26.

The nutation disk 1610, which is rotatably mounted about the axis Z-Z in the sealed compartment 21, is actuated by an actuator 27, of electric gear motor type, housed in the control compartment 22. The second mechanism 161 for moving in nutation comprises means for transmitting the movement of the actuator 27 to the nutation disk 1610.

Figure 5:
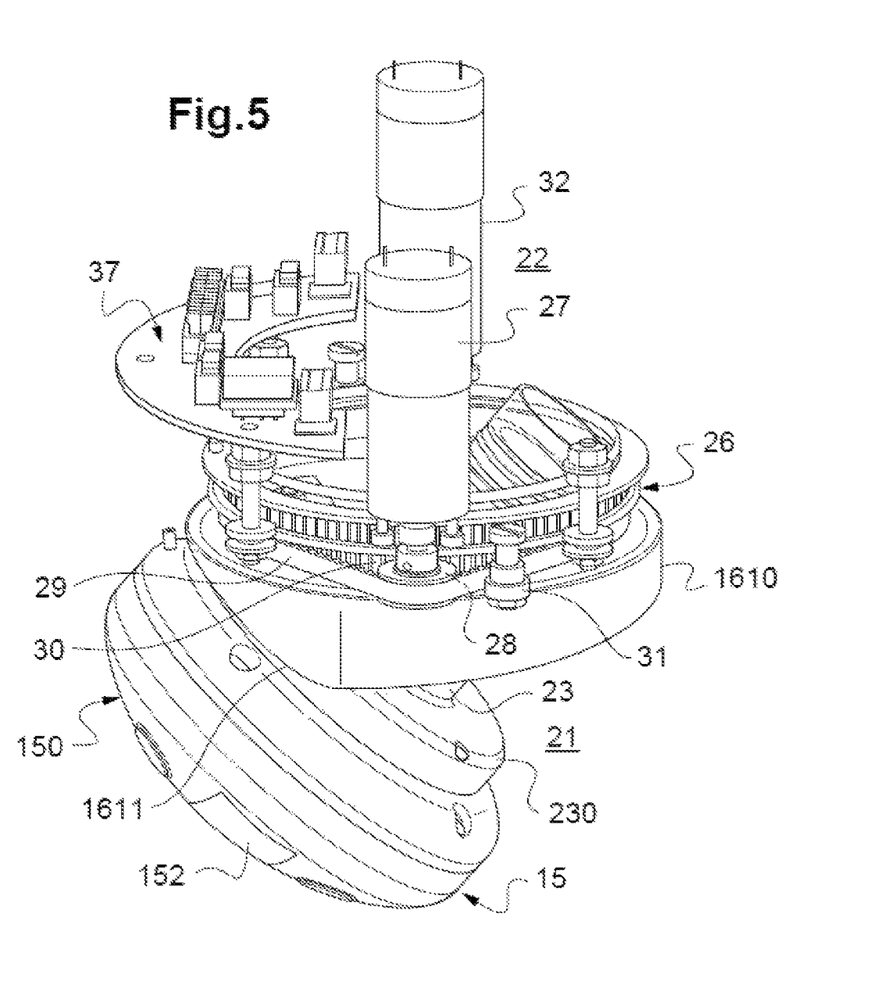
FIG. 5 is a simplified schematic perspective view illustrating means for transmitting the movement of the second mechanism for moving in nutation.

As seen more clearly in the simplified view in FIG. 5, where the dome, cover, secondary cover and sealed wall elements in particular have been retracted for greater visibility, the output shaft of the gear motor 27 passes tightly through the sealed wall and is coupled, on the side of the sealed compartment 21, with a pinion 28 meshing with a ring gear 29, in turn engaged, via a belt tightener 31, on a cogwheel 30 arranged on an outer periphery portion of the nutation disk 1610.

Such a belt transmission of the second mechanism 161 for moving in nutation makes it possible to transmit the movement without having to provide any central rotation shaft for the nutation disk 1610. This arrangement then makes it possible to advantageously free the central zone of the nutation disk 1610 for the passage of the guide sleeve 23 of the transducer module 15 to the central opening of the sealed wall.

Also, a rotational guidance of the nutation disk 1610 is provided by peripheral rollers, for example three in number, of which only two are seen in FIG. 4 under the references 1616, 1617. As illustrated in FIG. 4, these peripheral rollers, for example mounted on a respective bearing axis fastened to the base 260 of the turret 26, cooperate with an inner cylindrical surface 1615 of the nutation disk 1610, which ensures rotation guidance of the nutation disk 1610 about the axis of rotation Z-Z thereof.

In addition, the ring gear 30 at the periphery of the nutation disk 1610, with which the belt 29 meshes, being of a relatively large diameter, the meshing is performed on a large number of teeth, which makes it possible to reduce any parasitic variations of the speed of the output shaft of the actuator 27.

According to the invention and as explained above, the transducer module 15 can also be directed with respect to the fixed frame of the enclosure along a third fixed axis of rotation, which is the axis Z-Z, referred to as axis of precession, perpendicular to the axis of nutation X-X.

The means for moving the transducer module 15 integrated in the probe are then also adapted to control the rotation of the transducer module 15 about this axis of precession Z-Z.

For this purpose, the means for moving the transducer module 15 comprise a third mechanism 162 for moving the transducer module 15 in precession.

This third mechanism 162 for moving the transducer module 15 in precession consists of the turret 26, whereon the guide sleeve 23 is mounted, the turret 26 being in turn rotatably mounted with respect to the axis Z-Z, and by the means for transmitting a rotation movement to the turret 26. These transmission means are similar to the belt transmission means of the second nutation moving mechanism, provided to transmit the movement of the actuator 27 to the nutation disk 1610.

Also, the turret 26, which is rotatably mounted about the axis Z-Z in the sealed compartment 21, is actuated by an actuator 32, of electric gear motor type, mounted in the control compartment 22.

Figure 6:
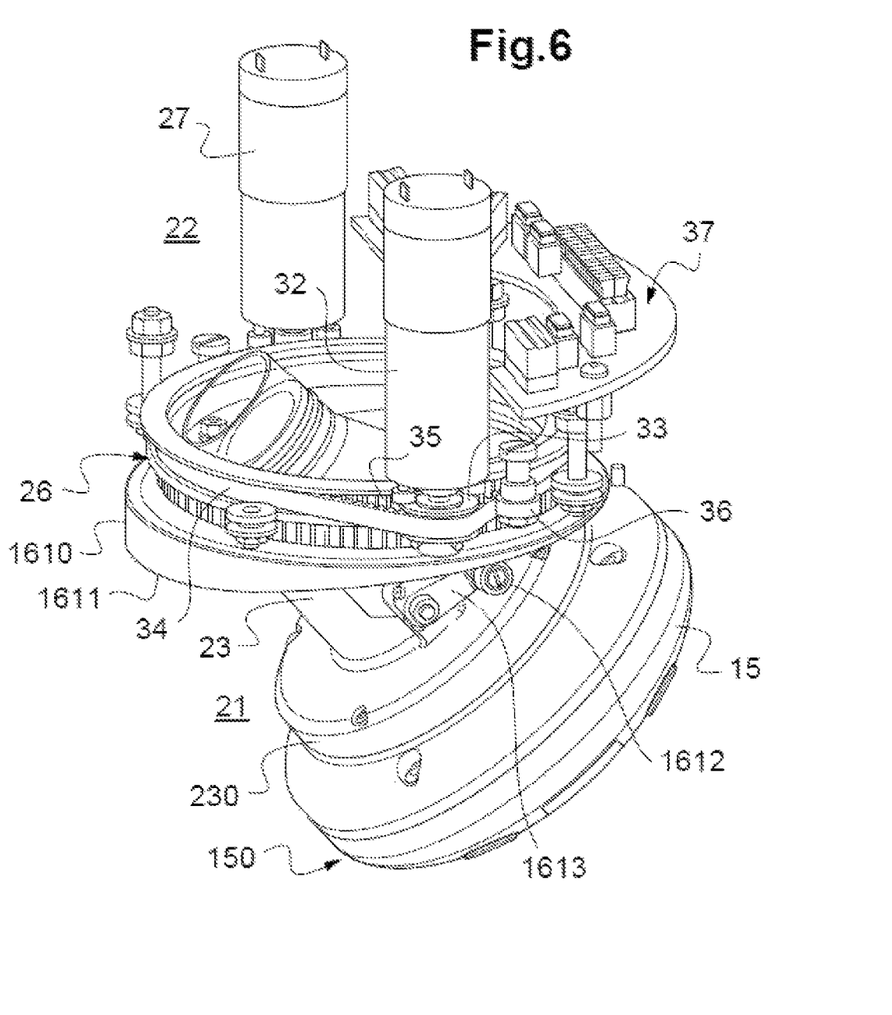
FIG. 6 is a simplified schematic perspective view illustrating means for transmitting the movement of the third mechanism for moving in precession.

As seen more clearly in the simplified view in FIG. 6, where as in FIG. 5, the dome, cover, secondary cover and sealed wall elements in particular have been retracted for greater visibility, the output shaft of the gear motor 32 passes tightly through the sealed wall and is coupled, on the side of the sealed compartment 21, with a pinion 33 meshing with a ring gear 34, in turn engaged, via a belt tightener 36, on a cogwheel 35 arranged on an outer periphery portion of the turret 26.

In this way, by rotating the turret 26 about the axis of precession Z-Z, the whole assembly consisting of the guide sleeve 23 and the transducer module 15 can be directed about this axis.

In the same way as for the rotation of the nutation disk 1610, rotational guidance of the turret 26 is provided by peripheral rollers. Thus, with reference to FIG. 4, peripheral rollers, for example four in number, 266-269, for example mounted on a respective bearing axis fastened tightly through the sealed wall, cooperate with an outer cylindrical surface of the turret 26, which ensures rotational guidance of the turret 26 about the axis of rotation Z-Z thereof.

Preferably, the two gear motors 27 and 32 used to rotate the nutation disk 1610 and the turret 26 respectively are moved at the same speed and in the same direction.

Thus, if it is sought to control the direction of the transducer module 15 only about the axis of precession Z-Z, it is necessary to activate the two gear motors 27 and 32 simultaneously. In this case, the nutation disk 1610 and the turret 26 are rotated simultaneously and at the same speed about the axis of precession Z-Z, such that only the direction of the transducer module 15 with respect to the axis of precession Z-Z is modified, without modifying the inclination of the transducer module 15.

Indeed, it is the differential rotation between the nutation disk 1610 and the turret 26, which will make it possible to create the rotational movement of the transducer module 15 along the axis of nutation X-X, to change the angle of inclination of the transducer module 15 in the sagittal plane of the turret 26.

Also, if it is sought to control a change of the angle of inclination of the transducer module 15 in the sagittal plane of the turret 26, the nutation disk 1610 is only controlled in rotation, whereas the turret 26 remains fixed.

A control circuit 37, comprising a printed circuit board housed in the control compartment 22 of the probe, is capable of controlling the three actuators 1601, 27 and 32, respectively for the control of the spinning, nutation and precession movement, according to the control instructions received from the control module.

As for the first spinning mechanism, the second mechanism for moving in nutation and the third mechanism for moving in precession cooperate with one or more angular position sensors, not shown, for example a Hall effect sensor type sensor, for respectively positioning the nutation disk and the turret and therefore the transducer module 15 in a known position (referred to as initial position), the position from which all the position set-points of the moving means are computed.

Moreover, independently of the nature of the means for moving the transducer module which are used in the probe, the quality of the tele-echography examination carried out by means of the probe of the invention will also rely on the ultrasonic wave transmission and reception quality.

We have seen that the acoustic coupling agent will make it possible to promote the propagation of the ultrasonic waves transmitted and received by the transducer module 15 housed in the sealed compartment 21. However, the transmission of the ultrasonic waves by the transducer module 15 can be inhibited by the acoustic impedance of the enclosure shell 180 of the dome 18, in other words by the resistance of this enclosure shell 180 to the passage of ultrasonic waves.

Therefore, it is sought that this enclosure shell 180, which is inserted between the transducer module 15 and the body of the patient undergoing the examination, have an adapted acoustic impedance. This firstly involves the choice of the material used to produce the enclosure shell 180. A material having an acoustic impedance similar to that of echographic gel will thus advantageously be chosen.

It is also sought that the enclosure shell 180 be sized according to the smallest possible thickness, so as to reduce the resistance of this enclosure shell 180 to the passage of ultrasonic waves.

However, this enclosure shell 180 of the dome must at the same time have high mechanical strength characteristics. In this regard, it must make it possible to absorb the forces applied to the dome 18, when the latter is positioned pressing against the patient's body during the use of the probe.

Such a compromise between a small thickness and a high mechanical strength can prove to be difficult according to the material used.

Also, a feature of the probe of the invention also aims to make it possible to produce a dome of small thickness while ensuring the mechanical strength required.

The enclosure shell 180 of the dome is preferably made of a thermoplastic polymer material.

Figure 7:
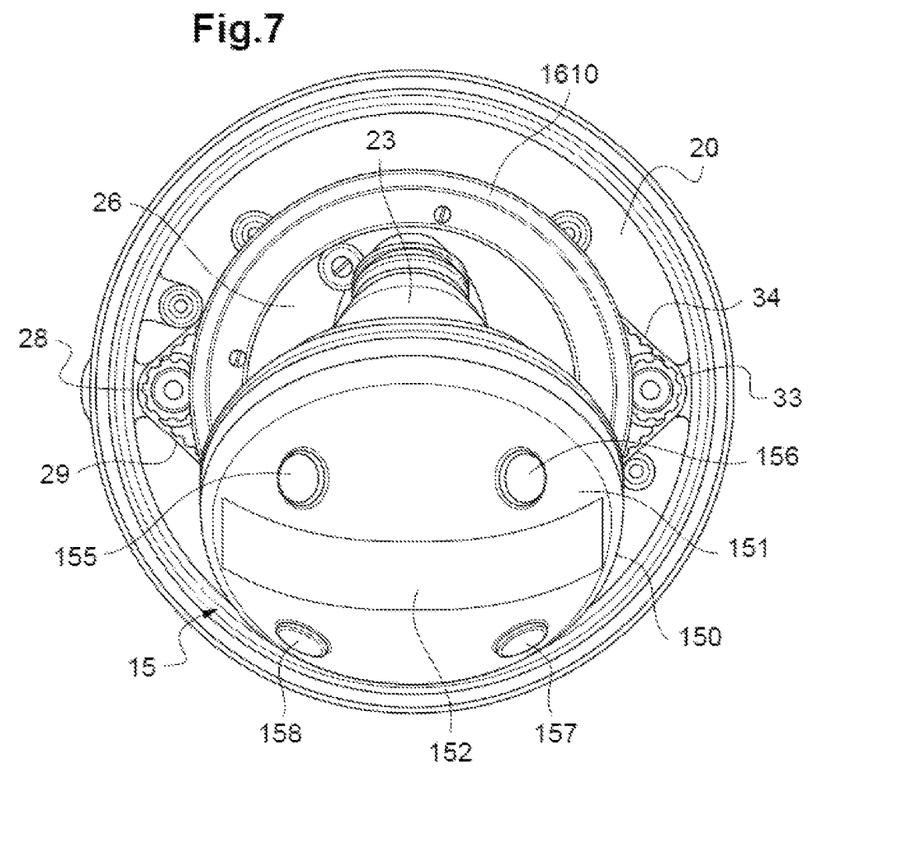
FIG. 7 is a simplified, schematic bottom view, illustrating a detail of the active face of the transducer module of the probe according to the invention.

As seen more clearly with reference to FIG. 7, the support housing 150 of the transducer module 15 is equipped on the active face 151 thereof directed facing the inner surface of the enclosure shell (not shown), with a set of pads projecting, preferably four in number, 155-158, each being intended to come into point contact with the inner surface of the enclosure shell of the dome. All of these pads thus form a support structure for the enclosure shell of the dome. In other words, the support housing of the transducer module also acts as a support for the dome.

This arrangement therefore makes it possible to provide an enclosure shell 180 for the dome 18 which is particularly thin, for the benefit of the good propagation of the ultrasonic waves, insofar as the transducer module 15 itself contributes, via the set of pads 155-158 projecting from the active face 151 thereof, to the mechanical strength of the dome 18.

The pads 155-158 are advantageously made of a material having a low friction coefficient with respect to the inner surface of the enclosure shell 180, preferably of polytetrafluoroethylene (Teflon®) or similar, so as to enable optimal sliding during the sweep of this inner surface of the enclosure shell of the dome by the transducer module.

Furthermore, the presence of the pads 155-158 projecting onto the active face 151 of the transducer module 15, i.e. the face facing the inner surface of the enclosure shell, advantageously makes it possible to ensure a predefined gap between the active face 151 of the transducer module 15 and the inner surface of the enclosure shell and thus, guarantee entirely identical ultrasonic wave propagation conditions of the enclosure shell during the sweep thereof by the transducer module 15.

The support housing 150 of the transducer module 15, via the pads thereof projecting on the active face 151 thereof, can be mounted pressing against the inner surface of the enclosure shell via a return spring, applying an elastic return to this pressing position of the pads against the inner surface of the enclosure shell, so as to ensure the predefined gap between the active face 151 of the transducer module 15 and the inner surface of the enclosure shell.

The invention claimed is:

1. Robot-assisted echographic probe, comprising an enclosure, an ultrasonic transducer module including a support housing mounted at a distal end of a guide sleeve in a sealed compartment of the enclosure that is separated from a control compartment of said enclosure by a sealed transversal wall, and means for moving said transducer module, adapted to direct said transducer module along three axes of rotation so as to sweep an inner surface of an enclosure shell of the sealed compartment, said means for moving being motor-driven by actuators, at least a portion of said actuators being housed in said control compartment, said means for moving the transducer module being arranged in the sealed compartment of the enclosure.

2. The probe according to claim 1, wherein the means for moving the transducer module comprise a first mechanism for spinning the transducer module on itself about the axis thereof.

3. The probe according to claim 2, wherein said first spinning mechanism is actuated by an actuator from the actuators, the actuator being housed in a hollow volume of the support housing of the transducer module.

4. The probe according to claim 3, wherein said first spinning mechanism comprises a worm screw, rigidly connected in rotation to an output shaft of the actuator that actuates the first spinning mechanism, engaged with a worm wheel mounted in said hollow volume, rigidly connected to a connection shaft, for connection, via a pinion mounted on an upper end of said connection shaft, with a cogwheel fixedly mounted on an inner periphery of the distal end of the guide sleeve.

5. The probe according to claim 2, wherein said means for moving the transducer module comprise a second mechanism for moving the transducer module in nutation, adapted to pivot said guide sleeve about an axis of nutation (X-X) perpendicular to the spinning axis of said transducer module.

6. The probe according to claim 5, wherein said means for moving the transducer module comprise a third mechanism for moving the transducer module in precession, adapted to control the rotation of said transducer module about a fixed axis of rotation, perpendicular to the axis of nutation.

7. The probe according to claim 5, wherein said guide sleeve being pivotably mounted between a pair of flanges rigidly connected to a turret arranged in the sealed compartment, each flange receiving a pivot whereon said guide sleeve is mounted, said second mechanism for moving in nutation comprises a nutation disk including a circular ramp mounted coaxially in rotation about said turret along a fixed axis of rotation, perpendicular to the axis of nutation, said circular ramp being linked with a rigidly connected guide roller, via a lever arm, of one of said pivots, such that the rotation of the nutation disk forces the pivoting of said pivot about the axis of nutation according to the angle of inclination of said circular ramp.

8. The probe according to claim 7, wherein said guide roller is held against said circular ramp by an elastic return means opposing the force applied on said pivot by said lever arm.

9. The probe according to claim 7, wherein said nutation disk is actuated by an actuator from the actuators, the actuator being housed in the control compartment.

10. The probe according to claim 9, wherein an output shaft of the actuator that actuates said nutation disk is coupled, on the sealed compartment side, with a pinion meshing with a synchronous belt engaged on a ring gear arranged on an outer periphery portion of said nutation disk.

11. The probe according to claim 7, wherein said means for moving the transducer module comprise a third mechanism for moving the transducer module in precession, adapted to control the rotation of said transducer module about a fixed axis of rotation, perpendicular to the axis of nutation, and wherein said third mechanism for moving the transducer module in precession comprises said turret, in turn rotatably mounted in relation to said fixed axis of rotation.

12. The probe according to claim 11, wherein said turret is actuated by an actuator from the actuators, the actuator being housed in said control compartment.

13. The probe according to claim 12, wherein an output shaft of said actuator that actuates said turret is coupled, on the sealed compartment side, with a pinion meshing with a synchronous belt engaged on a ring gear arranged on an outer periphery portion of said turret.

14. The probe according to claim 1, wherein said transducer module comprises a set of pads arranged projecting on an active face of said support housing, oriented facing said inner surface of the enclosure shell, each of said pads being intended to come into point contact with said inner surface of the enclosure shell, so as to form a support structure for said enclosure shell.

15. The probe according to claim 14, wherein said pads are made of a material having a low friction coefficient with respect to said inner surface of the enclosure shell.

16. The probe according to claim 14, wherein said pads are made of polytetrafluoroethylene.

\* \* \* \* \*